United States Patent
Low et al.

(10) Patent No.: US 10,320,203 B2
(45) Date of Patent: Jun. 11, 2019

(54) ADAPTIVE CHARGING ALGORITHMS FOR A NETWORK OF ELECTRIC VEHICLES

(71) Applicant: California Institute of Technology, Pasadena, CA (US)

(72) Inventors: Zhi H. Low, Pasadena, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 242 days.

(21) Appl. No.: 15/295,877

(22) Filed: Oct. 17, 2016

(65) Prior Publication Data

US 2017/0110895 A1 Apr. 20, 2017

Related U.S. Application Data

(60) Provisional application No. 62/242,410, filed on Oct. 16, 2015.

(51) Int. Cl.
*H02J 7/00* (2006.01)
*H02J 7/04* (2006.01)
(Continued)

(52) U.S. Cl.
CPC ......... *H02J 7/0021* (2013.01); *B60L 11/1844* (2013.01); *G05B 13/041* (2013.01);
(Continued)

(58) Field of Classification Search
CPC .... H02J 7/0021; H02J 2007/0096; H02J 7/04; H02J 7/0027; H02J 7/0013;
(Continued)

(56) References Cited

U.S. PATENT DOCUMENTS

| 8,972,074 B2 | 3/2015 | Marasanapalle et al. |
| 9,024,580 B2 | 5/2015 | Wu et al. |

(Continued)

FOREIGN PATENT DOCUMENTS

| KR | 1020120075010 B1 | 1/2013 |
| KR | 101566715 B1 | 11/2015 |

(Continued)

OTHER PUBLICATIONS

C. Hutson, G. K. Venayagamoorthy and K. A. Corzine, "Intelligent Scheduling of Hybrid and Electric Vehicle Storage Capacity in a Parking Lot for Profit Maximization in Grid Power Transactions," 2008 IEEE Energy 2030 Conference, Atlanta, GA, 2008, pp. 1-8. (Year: 2008).*

(Continued)

*Primary Examiner* — Brian W Wathen
*Assistant Examiner* — Mohammed Shafayet
(74) *Attorney, Agent, or Firm* — KPPB LLP

(57) ABSTRACT

Electric vehicle node controllers in accordance with embodiments of the invention enable adaptive charging. One embodiment includes one or more centralized computing systems; a communications network; a plurality of electric vehicle node controllers, where each electric vehicle node controller in the plurality of node controllers contains: a network interface; a processor; a memory containing: an adaptive charging application; a plurality of electric vehicle node parameters describing charging parameters of an electric vehicle node in the electric vehicle charging network; where the processor is configured by the adaptive charging application to: send electric vehicle node parameters to the one or more centralized computing systems; and charge the electric vehicle node using a charging rate received from the one or more centralized computing systems; where the one or more centralized computing systems is configured to:

(Continued)

receive the electric vehicle node parameters from the plurality of electric vehicle node controllers; calculate a plurality of charging rates for the plurality of electric vehicle node controllers using the electric vehicle node parameters, a plurality of adaptive charging parameters, and a cost function; and send the charging rates to the plurality of electric vehicle node controllers.

16 Claims, 11 Drawing Sheets

(51) Int. Cl.
  *B60L 11/18* (2006.01)
  *G05B 13/04* (2006.01)
(52) U.S. Cl.
  CPC .......... *H02J 7/0013* (2013.01); *H02J 7/0027* (2013.01); *H02J 7/04* (2013.01); *B60L 2230/40* (2013.01); *H02J 2007/0096* (2013.01); *Y02E 60/721* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 30/12* (2013.01)
(58) Field of Classification Search
  CPC ............... G05B 13/041; B60L 11/1824; B60L 2230/40; B60L 11/1844; G06F 17/11; Y02T 10/7055; Y02T 90/163; Y02T 90/16; Y02T 10/7005; Y02T 10/7088; Y02T 90/128; Y02T 90/14; Y02T 90/121; Y02T 90/168; Y02E 60/721; Y04S 30/12; Y04S 10/126
  USPC ........................................................ 700/296
  See application file for complete search history.

(56) References Cited

U.S. PATENT DOCUMENTS

| | | | |
|---|---|---|---|
| 9,093,844 B2 | 7/2015 | Yonezawa et al. | |
| 9,112,382 B2 | 8/2015 | Aisu et al. | |
| 9,148,027 B2 | 9/2015 | Shane et al. | |
| 9,225,171 B2 | 12/2015 | Chen et al. | |
| 2008/0281663 A1* | 11/2008 | Hakim | B60L 11/1824 705/7.25 |
| 2010/0134067 A1 | 6/2010 | Baxter et al. | |
| 2010/0280675 A1* | 11/2010 | Tate, Jr. | H01M 10/44 700/295 |
| 2011/0153474 A1* | 6/2011 | Tormey | G06Q 20/40 705/31 |
| 2012/0029720 A1* | 2/2012 | Cherian | H02J 13/00 700/297 |
| 2012/0044843 A1 | 2/2012 | Levy et al. | |
| 2012/0049793 A1 | 3/2012 | Ross | |
| 2012/0074893 A1 | 3/2012 | Cole | |
| 2012/0180064 A1* | 7/2012 | Helander | G06F 9/4887 718/104 |
| 2012/0200256 A1* | 8/2012 | Tse | H02J 7/0013 320/109 |
| 2013/0057210 A1 | 3/2013 | Nergaard et al. | |
| 2013/0110296 A1 | 5/2013 | Khoo | |
| 2013/0211988 A1 | 8/2013 | Dorn et al. | |
| 2014/0032007 A1 | 1/2014 | Claessens et al. | |
| 2014/0070606 A1* | 3/2014 | Gibeau | B60L 11/1862 307/9.1 |
| 2014/0089016 A1* | 3/2014 | Smullin | G06Q 10/02 705/5 |
| 2014/0167985 A1 | 6/2014 | Halnais et al. | |
| 2014/0232337 A1* | 8/2014 | Namou | H02J 7/0027 320/109 |
| 2014/0312839 A1* | 10/2014 | Uyeki | B60L 11/1838 320/109 |
| 2015/0009047 A1 | 1/2015 | Ashkenazi et al. | |
| 2015/0120109 A1 | 4/2015 | Cun | |
| 2015/0137768 A1* | 5/2015 | Kishiyama | H02J 7/0027 320/137 |
| 2015/0165924 A1* | 6/2015 | Cho | B60L 11/1838 320/157 |
| 2015/0346698 A1 | 12/2015 | Mailloux et al. | |
| 2015/0367740 A1* | 12/2015 | McGrath | B60L 11/1837 320/137 |
| 2016/0009192 A1 | 1/2016 | Zhang et al. | |
| 2016/0031338 A1 | 2/2016 | Penilla et al. | |
| 2016/0047862 A1* | 2/2016 | Shimizu | H02J 3/00 702/63 |
| 2016/0121748 A1 | 5/2016 | Wytock et al. | |
| 2016/0214489 A1* | 7/2016 | Giusti | B60L 3/12 |
| 2017/0246961 A1 | 8/2017 | Lee et al. | |

FOREIGN PATENT DOCUMENTS

| | | |
|---|---|---|
| WO | 2017066790 A1 | 4/2017 |
| WO | 2017147612 A1 | 8/2017 |

OTHER PUBLICATIONS

W. Zhang, S. Teng, Z. Zhu, X. Fu and H. Zhu, "An Improved Least-Laxity-First Scheduling Algorithm of Variable Time Slice for Periodic Tasks," 6th IEEE International Conference on Cognitive Informatics, Lake Tahoo, CA, 2007, pp. 548-553. (Year: 2007).*
International Search Report and Written Opinion for International Application No. PCT/US2016/057398, Search completed Jan. 23, 2017, dated Jan. 23, 2017, 8 Pgs.
International Search Report and Written Opinion for International Application No. PCT/US2017/019787, Search completed May 24, 2017, dated May 24, 2017, 14 Pgs.
"Electric Vehicle Public Charging—Time vs. Energy", U.S. Department of Energy, The EV Project, Mar. 2013, 4 pages.
"High level analysis of the plugged-in places chargepoint usage data", UK Office of Low Emission Vehicles, Sep. 4, 2013, retrieved from https://www.gov.uk/government/publications/high-level-analysis-of-the-plugged-in-places-chargepoint-usage-data, 34 pages.
Alsac et al., "Further developments in LP-based optimal power flow", IEEE Transactions on Power Systems, vol. 5, Issue 3, Aug. 1990, pp. 697-711.
Bernardo, "Fast Charging Stations: Network Planning versus Free Entry", Apr. 22, 2013, 14 pages.
Bitar et al., "Deadline differentiated pricing of deferrable electric power service", 2012 IEEE 51st IEEE Conference on Decision and Control (CDC), Dec. 10-13, 2012, Maui, HI, USA, pp. 4991-4997.
Bitar et al., "Deadline differentiated pricing of delay-tolerant demand", arXiv:1407.1601 [math.OC], Jan. 20, 2015.
Carpentier, J., "Contribution to the economic dispatch problem", Bulletin de la Societe Francoise des Electriciens, vol. 3, No. 8, 1962, pp. 431-447.
Chang et al., "Financial Viability of Non-Residential Electric Vehicle Charging Stations", Technical report, Luskin Center, Anderson School of Management, UCLA, Aug. 2012, 51 pages.
Chen et al., "iEMS for large scale charging of electric vehicles: Architecture and optimal online scheduling", 2012 IEEE Third International Conference on Smart Grid Communications (SmartGridComm), Nov. 5-8, 2012, Tainan, Taiwan, pp. 629-634.
Chen et al., "Optimizing Operations for Large Scale Charging of Electric Vehicles", 2013 46th Hawaii International Conference on System Sciences, Jan. 7-10, 2013, Wailea, Maui, HI, USA, pp. 2319-2326.
Clement-Nyns et al., "The Impact of Charging Plug-In Hybrid Electric Vehicles on a Residential Distribution Grid", IEEE Transactions on Power Systems, vol. 25, Issue 1, Feb. 2010, pp. 371-380.
Dommel et al., "Optimal Power Flow Solutions", IEEE Transactions on Power Apparatus and Systems, vol. PAS-87, Issue 10, Oct. 1968, pp. 1866-1876.

(56) References Cited

OTHER PUBLICATIONS

Frade et al., "Optimal Location of Charging Stations for Electric Vehicles in a Neighborhood in Lisbon, Portugal", Transportation Research Record: Journal of the Transportation Research Board, No. 2252, 2011, pp. 91-98.
Gan et al., "Optimal decentralized protocol for electric vehicle charging", 2011 50th IEEE Conference on Decision and Control and European Control Conference, Dec. 12-15, 2011, Orlando, FL, USA, pp. 5798-5804.
Gan et al., "Optimal decentralized protocol for electric vehicle charging", IEEE Transactions on Power Systems, vol. 28, Issue 2, May 2013, pp. 940-951.
Ge et al., "The Planning of Electric Vehicle Charging Stations in the Urban Area", 2nd International Conference on Electronic & Mechanical Engineering and Information Technology (EMEIT-2012), Nov. 2012, pp. 1598-1604, doi:10.2991/emeit.2012.356.
He et al., "Optimal deployment of public charging stations for plug-in hybrid electric vehicles", Transportation Research Part B: Methodological, vol. 47, Jan. 2013, pp. 87-101.
Low, "Convex Relaxation of Optimal Power Flow—Part II: Exactness", IEEE Transactions on Control of Network Systems, Jun. 2014, vol. 1, No. 2, pp. 177-189.
Low, "Convex Relaxation of Optimal Power Flow Part I: Formulations and Equivalence", IEEE Trans. on Control of Network Systems, Apr. 15, 2014, vol. 1, No. 1, pp. 15-17 Retrieved from the Internet: http://arxiv.org/pdf/1405, published May 5, 2014, 44 pgs.
Ma et al., "Decentralized charging control for large populations of plug-in electric vehicles", 49th IEEE Conference on Decision and Control (CDC), Dec. 15-17, 2010, Atlanta, GA, USA, pp. 206-212.
Ma et al., "Decentralized Charging Control of Large Populations of Plug-in Electric Vehicles", IEEE Transactions on Control Systems Technology, vol. 21, Issue 1, Jan. 2013, pp. 67-78.
Overbye et al., "A comparison of the AC and DC power flow models for LMP calculations", 37th Annual Hawaii International Conference on System Sciences, Jan. 5-8, 2004, Big Island, HI, USA, 9 pages.
Purchala et al., "Usefulness of DC power flow for active power flow analysis", IEEE Power Engineering Society General Meeting, Jun. 16, 2005, San Francisco, CA, USA, pp. 454-459.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93, No. 3, pp. 859-869.
Wang et al., "EV charging algorithm implementation with user price preference", 2015 IEEE Power & Energy Society Innovative Smart Grid Technologies Conference (ISGT), Feb. 18-20, 2015, Washington, DC, USA, pp. 1-5.
Wang et al., "Event-based electric vehicle scheduling considering random user behaviors", 2015 IEEE International Conference on Smart Grid Communications (SmartGridComm), Nov. 2-5, 2015, Miami, FL, USA, pp. 313-318.
Yu et al., "On market dynamics of electric vehicle diffusion", 2014 52nd Annual Allerton Conference on Communication, Control, and Computing (Allerton), Sep. 30-Oct. 3, 2014, Monticello, IL, USA, pp. 1051-1057.
International Preliminary Report on Patentability for International Application PCT/US2016/057398, Report dated Apr. 17, 2018, dated Apr. 26, 2018, 6 Pgs.
International Preliminary Report on Patentability for International Application PCT/US2017/019787, Report dated Aug. 28, 2018, dated Sep. 7, 2018, 11 Pgs.

* cited by examiner

ADAPTIVE CHARGING ALGORITHMS FOR A NETWORK OF ELECTRIC VEHICLES

CROSS-REFERENCE TO RELATED APPLICATIONS

The present invention claims priority to U.S. Provisional Patent Application Ser. No. 62/242,410 entitled "Adaptive Charging Algorithm for a Network of Electric Vehicles" to Zhi H. Low et al., filed Oct. 16, 2015. The disclosure of U.S. Provisional Patent Application Ser. No. 62/242,410 is herein incorporated by reference in its entirety.

FIELD OF THE INVENTION

The present invention generally relates to electric vehicles and more specifically relates to adaptive charging processes for electric vehicles.

BACKGROUND

An incredible amount of infrastructure is relied upon to transport electricity from power stations, where the majority of electricity is currently generated, to where it is consumed by individuals. Power stations can generate electricity in a number of ways including using fossil fuels or using renewable sources of energy such as solar, wind, and hydroelectric sources. Substations typically do not generate electricity, but can change the voltage level of the electricity as well as provide protection to other grid infrastructure during faults and outages. From here, the electricity travels over distribution lines to bring electricity to homes, businesses, schools, etc.

Electric vehicles (EVs) use an electric motor for propulsion. EV adoption has been spurred by federal, state, and local government policies providing various incentives (e.g. rebates, fast lanes, parking, etc.). The term "smart grid" describes a new approach to power distribution which leverages advanced technology to track and manage the distribution of electricity. A smart grid applies upgrades to existing power grid infrastructure including the addition of more renewable enemy sources, advanced smart meters that digitally record power usage in real time, and bidirectional energy flow that enables the generation and storage of energy in additional places along the electric grid. Continued EV adoption will have a big impact on the future smart grid from the huge load EVs add to the stress of the grid (an EV's power demand can be many times that of an average residential house).

SUMMARY OF THE INVENTION

The growth of EVs depends on, and will drive, the growth of charging stations. More and more parking garages at shopping malls, retailers, theaters, airports, cities centers, and corporate campuses will equip their parking spaces with EV chargers. As the price of EV chargers continues to drop, more and more garages will install them. Indeed the number of public charging stations has increased by 7× between 2011-2013. One conclusion is that charger hardware will not be a bottleneck in the future. Retrofitting existing parking spaces with Level (L2) EV chargers can be a significant cost; the installation cost when building (or renovating) a new garage, however, will be minimal. Therefore a tremendous drive can be expected in the near future to equip a significant fraction of a large number of garages, parking lots, even street parkings with EV chargers, especially when building new structures.

This will create an emerging painpoint: the bottleneck to large-scale charging infrastructure is not the cost of chargers, but the limited capacity of electricity distribution system, as well as, in city centers, the real estate. Specifically, existing electrical infrastructure in parking garages and office parks are often inadequate for installing a meaningful number of EV charging stations. The transformers and available breaker spaces are usually limiting factors because they were originally designed to handle only air circulation and lighting loads. The current solutions are: (i) install only a few chargers in order to stay within the power capacity of the parking structure; or (ii) increase the power capacity of the parking structure. The first solution will not be acceptable as EV adoption accelerates, and the second solution will be extremely expensive, if possible at all.

A better solution is to install a large number of chargers and then exploit the inherent flexibility of EV charging to adaptively control the charging rates of EVs in a way that achieves several objectives: (1) Stays within the power capacity of the parking infrastructure; (2) Meets the charging requirements of all EVs within their deadlines whenever possible; (3) Fairly allocates charging capacity among competing EVs otherwise; (4) Optimizes certain performance metrics such (but not limited to) as asset utilization, electricity cost or revenue to the garage, or charging delay and/or, system robustness.

Electric vehicle node controllers in accordance with embodiments of the invention enable adaptive charging. One embodiment includes one or more centralized computing systems; a communications network; a plurality of electric vehicle node controllers, where each electric vehicle node controller in the plurality of node controllers contains: a network interface; a processor; a memory containing: an adaptive charging application; a plurality of electric vehicle node parameters describing charging parameters of an electric vehicle node in the electric vehicle charging network; where the processor is configured by the adaptive charging application to: send electric vehicle node parameters to the one or more centralized computing systems; and charge the electric vehicle node using a charging rate received from the one or more centralized computing systems; where the one or more centralized computing systems is configured to: receive the electric vehicle node parameters from the plurality of electric vehicle node controllers; calculate a plurality of charging rates for the plurality of electric vehicle node controllers using the electric vehicle node parameters, a plurality of adaptive charging parameters, and a cost function; and send the charging rates to the plurality of electric vehicle node controllers.

In a further embodiment, the charging rates meet the energy demand of the plurality of electric vehicle nodes by a plurality of departure times.

In another embodiment, the charging rates for the plurality of electric vehicle nodes are a time series of timing rates provided to each electric vehicle node controller.

In a still further embodiment, the time series of timing rates is calculated using an online linear program process.

In still another embodiment, the electric vehicle node parameters include an electric vehicle departure time, a remaining enemy demand, and a peak charging rate.

In a yet further embodiment, the time series of timing rates can be evaluated by the one or more centralized computing systems using the following expression:

$OLP(t)$:

$$\min_{r_i(\tau), \tau \geq t} C(r)$$

$$\text{subject to} \quad r_i(\tau) = 0 \quad i = 1, \ldots, N, \tau \geq t_i$$

$$r_i(\tau) <= \bar{r}_i, \quad i = 1, \ldots, N, \tau = 1, \ldots T-1$$

$$\sum_{\tau=t}^{T-1} r_i(\tau) = e_i(t) \quad i = 1, \ldots, N$$

$$\sum_i r_i(\tau) \leq P, \quad \tau = t, \ldots, T-1$$

where OLP(t) are the adaptive charging parameters, t and T are times, $\bar{r}_i$ a peak charging rate of electric vehicle i, τ is a departure time, $r_i(\tau)$ is a calculated charging rate for an electric vehicle node at time τ, C(r) is the linear cost function, N is a total number of electric vehicles, P is a station power limit, and $t_i$ is a deadline.

In yet another embodiment, the cost function can be evaluated by the one or more centralized computing systems using the following expression: $r^*(t):=(r^*_i(\tau), \tau=t, \ldots, t_i-1, i=1, \ldots, N(t))$
where t is a time, $r^*(\tau)$ is the optimal charging rate at time τ, $r^*(t)$ is a vector of charging rates for current and future times, τ is a departure time, i is an electric vehicle, and N(t) is a number of electric vehicles at time t.

In a further embodiment again, the cost function is a linear function.

In a further additional embodiment, the cost function comprises a cost function selected from the group consisting of electricity cost, revenue to a garage, maximum charging delay, asset utilization, and system robustness.

In another additional embodiment, the charging rates for a first set of electric vehicle node controllers are a maximum charging rate; the charging rates for a second set of electric vehicle node controllers are zero charge; and the charging rate for one electric vehicle node controller is less than the maximum charging rate.

In a still yet further embodiment, distributing charging rates into the first set of electric vehicle node controllers, the second set electric vehicle node controllers, and one electric vehicle node controller is a least laxity first first process.

In still yet another embodiment, the least laxity first process further includes calculating a plurality of laxity of parameters corresponding to the plurality of electric vehicle nodes, where the electric vehicle with the smallest laxity parameter value is charged first.

In a still further embodiment again, a laxity parameter in the plurality of laxity parameters is a slack time the corresponding electric vehicle node has before it must charge at its peak rate in order to meet a deadline.

In still another embodiment again, a laxity parameter in the plurality of laxity parameters can be evaluated by the one or more centralized computing systems using the following expression:

$$l_i(t) := 1 - \frac{e_i(t)}{\bar{r}_i(t_i - t)}$$

where $l_i(t)$ is the laxity parameter, t is a time, $t_i$ is a deadline, $e_i(t)$ is a remaining energy demand, and $\bar{r}_i$ is a peak rate.

Another further embodiment of the method of the invention includes: calculating exit parameter is a distributed process.

Still another further embodiment of the method of the invention includes: calculating a laxity parameter is a centralized process.

In yet another embodiment, an electric vehicle charging network, comprising: one or more centralized computing systems; a communications network; a plurality of electric vehicle node controllers, where each electric vehicle node controller in the plurality of node controllers contains: a network interface; a processor; a memory containing: an adaptive charging application; a plurality of electric vehicle node parameters describing charging parameters of an electric vehicle node in the electric vehicle charging network; where the processor is configured by the adaptive charging application to: send electric vehicle node parameters to the one or more centralized computing systems; and charge the electric vehicle node using a charging rate received from the one or more centralized computing systems; where the one or more centralized computing systems is configured to: calculate a feasibility of a plurality of adaptive charging parameters and a cost function parameter, where the adaptive charging parameters describe the electric vehicle charging network; wherein where the plurality of adaptive charging parameters and the cost function parameter are feasible, calculate charging rates for the plurality of electric vehicle node controllers where the charging rates are a time series of timing rates; wherein where the plurality of adaptive charging parameters and the cost function parameter are not feasible, calculate charging rates for the plurality of electric vehicle node controllers where: the charging rates for a first set of electric vehicle de controllers are a maximum charging rate; the charging rates for a second set of electric vehicle node controllers are zero charge; and the charging rate for one electric vehicle node controller is less than the maximum charging rate; and send the charging rates to the plurality of electric vehicle node controllers.

In a further embodiment the plurality of adaptive charging parameters can be evaluated by the one or more centralized computing systems using the following expressions:

$OPT\text{-}cm$:

$$\min_{r \geq 0} C(r) + \sum_i c_i(d_i)$$

$$\text{subject to} \quad r_i(t) = 0 \quad i = 1, \ldots, N, t < s_i \text{ or } t \geq t_i$$

$$r_i(\tau) <= \bar{r}_i, \quad i = 1, \ldots, N, \tau = 1, \ldots T-1$$

$$d_i := \frac{1}{e_i} \sum_{t=s_i}^{t_i-1} r_i(t) \geq \underline{d}_i, \quad i = 1, \ldots, N$$

$$\sum_i r_i(t) \leq P, \quad t = 1, \ldots, T-1$$

where OPT-cm are the adaptive charging parameters, i is an electric vehicle, N is a total number of electric vehicles, C(r) is the linear cost function, $c_i(d_i)$ are cost parameters, $r_i$ is orate, $r_i(\tau)$ is a calculated charging rate for an electric vehicle node at time τ, $s_i$ is an arrival time, $t_i$ is a deadline, t and T are times, and P is a station power limit.

In another embodiment again, the cost function parameter is a linear function.

In a further additional embodiment, the cost function parameter is selected from the group consisting of electricity cost, revenue to a garage, maximum charging delay, asset utilization, and system robustness.

In another additional embodiment, wherein where the plurality of adaptive charging parameters and the cost function parameter are feasible, calculate charging rates using an online linear program process.

In a still yet further embodiment, wherein where the plurality of adaptive charging parameters and the cost function parameter are not feasible, calculate charging rates using a least laxity first process.

DETAILED DESCRIPTION

Figure 1:
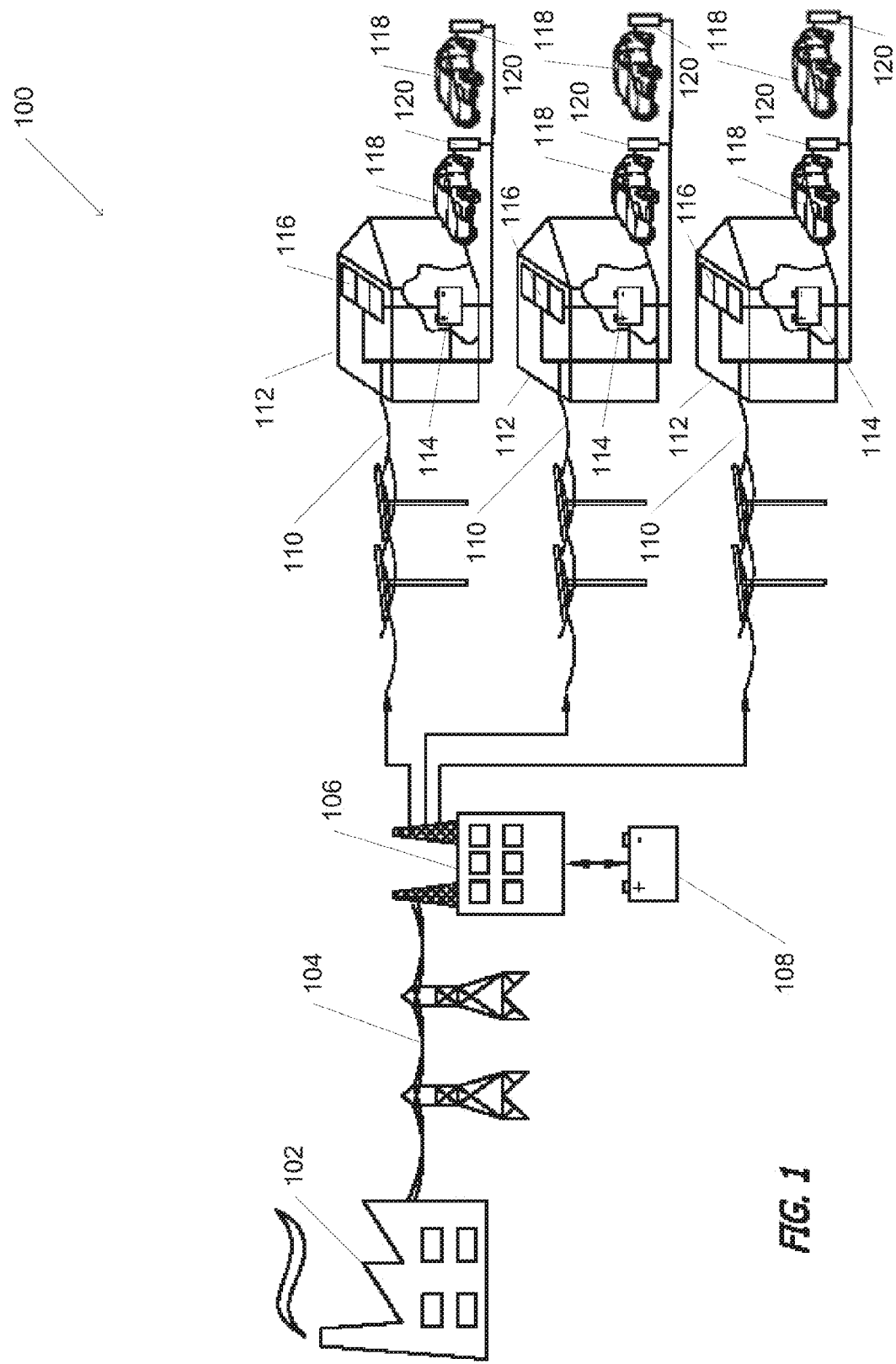
FIG. 1 is a diagram conceptually illustrating a power distribution network in accordance with an embodiment of the invention.

Turning now to the drawings, systems and methods for adaptive charging of electric vehicles (EVs) at an electric charging station in accordance with embodiments of the invention are illustrated. Many charging stations can support the simultaneous charging of multiple EVs. Power can be distributed between the chargers at the charging station in a variety of manners.

An optimization problem can be utilized to increase the performance of the distribution of power between chargers to EVs at a charging station with respect to particular goals. The optimal charging (OPT) problem typically seeks to minimize one or more constraints including (but not limited to) an electricity cost, a revenue cost, a maximum charging delay, an asset utilization, a system robustness, and/or other operational constraints. The OPT problem can be solved when equilibrium points are found. In various embodiments, adaptive charging processes can be utilized to solve for these equilibrium points including (but not limited to) least laxity first processes, online linear program processes, and linear program processes that incorporate congestion management.

A least laxity first (LLF) process calculates a laxity for each EV in a network. In many embodiments of the invention, laxity is the time an EV has before it must charge at its peak rate in order to meet a deadline. Specifically, LLF processes schedule EV charging such that the EV with the smallest laxity begins charging first.

In many embodiments, the cost function of the OPT problem can be a linear function, which enables the OPT problem to be formulated as a linear program. Linear programs optimize a linear function such as (but not limited to) a cost function subject linear constraints. These linear constraints produce a convex feasible region of possible values for those constraints. An on-line process communicates with EV nodes when performing calculations (compared to an offline process which can use stored EV parameters and does not need to be connected to EV nodes to perform calculations). Online linear programs are linear programs which communicate with EV nodes during calculations.

Online linear program (OLP) processes can be utilized to solve OPT problems, which are linear programs. In many embodiments of the invention, OLP processes calculate optimal charging rate for all EVs at the charging station at any given time t. This entire calculation is repeated for time (t+1) to recalculate optimal charging rate for all EVs since new EVs may have arrived and EVs may have left the charging station.

Congestion can occur at times of heavy demand for charging station resources. Linear programs with congestion management (LP-CM) processes can alleviate congestion by combining a variety of adaptive charging processes. Generally, the combination of processes can better allocate energy resources than an individual adaptive charging process in a congested charging network. In various embodiments of the invention, LP-CM processes can be a combination of OLP and LLF processes. LP-CM processes in accordance with many embodiments of the invention, can behave similarly to a OLP process until an unfeasible state is reached. When unfeasibility is encountered, the LP-CM behaves in a manner similar to a LLF process. Once feasibility is reached once again in the charging station, the LP-CM process once again behaves in a manner similar to an OLP process. Charging stations and processes utilized to perform adaptive charging of EVs in accordance with embodiments of the invention are discussed further below.

Electric Vehicle Power Distribution Networks

A power distribution network in accordance with an embodiment of the invention is shown in FIG. 1. Electricity is generated at power generator 102. Power transmission lines 104 can transmit electricity between the power generator and power substation 106. Power substation 106 additionally can connect to large storage battery 108 which temporarily stores electricity, as well as power distribution lines 110. The power distribution lines 110 can transmit electricity from the power substation to electric charging stations 112. Electric charging stations 112 can include a battery 114, solar panels 116, and EV chargers 120. Electric vehicles 118 can connect to the electric charging network (and therefore to the power distribution network) at the chargers. Some charging stations can only charge a small number of electric vehicles, while others can have the necessary infrastructure to charge dozens or even hundreds of electric vehicles simultaneously.

The power generator 102 can represent a power source including (but not limited to) those using fossil fuels, nuclear, solar, wind, or hydroelectric power. Substation 106 changes the voltage of the electricity for more efficient power distribution. Solar panels 116 are distributed power generation sources, and can generate power to supply electric charging stations as well as generate additional power for the power grid.

Although many different systems are described above with reference to FIG. 1, any of a variety of power distribution networks including EV node controllers may be utilized to perform adaptive charging processes as appropriate to the requirements of specific applications in accordance with embodiments of the invention. EV nodes connected to a communication network in accordance with various embodiments of the invention are discussed below.

Electric Vehicle Node Controller Architectures

Figure 2:
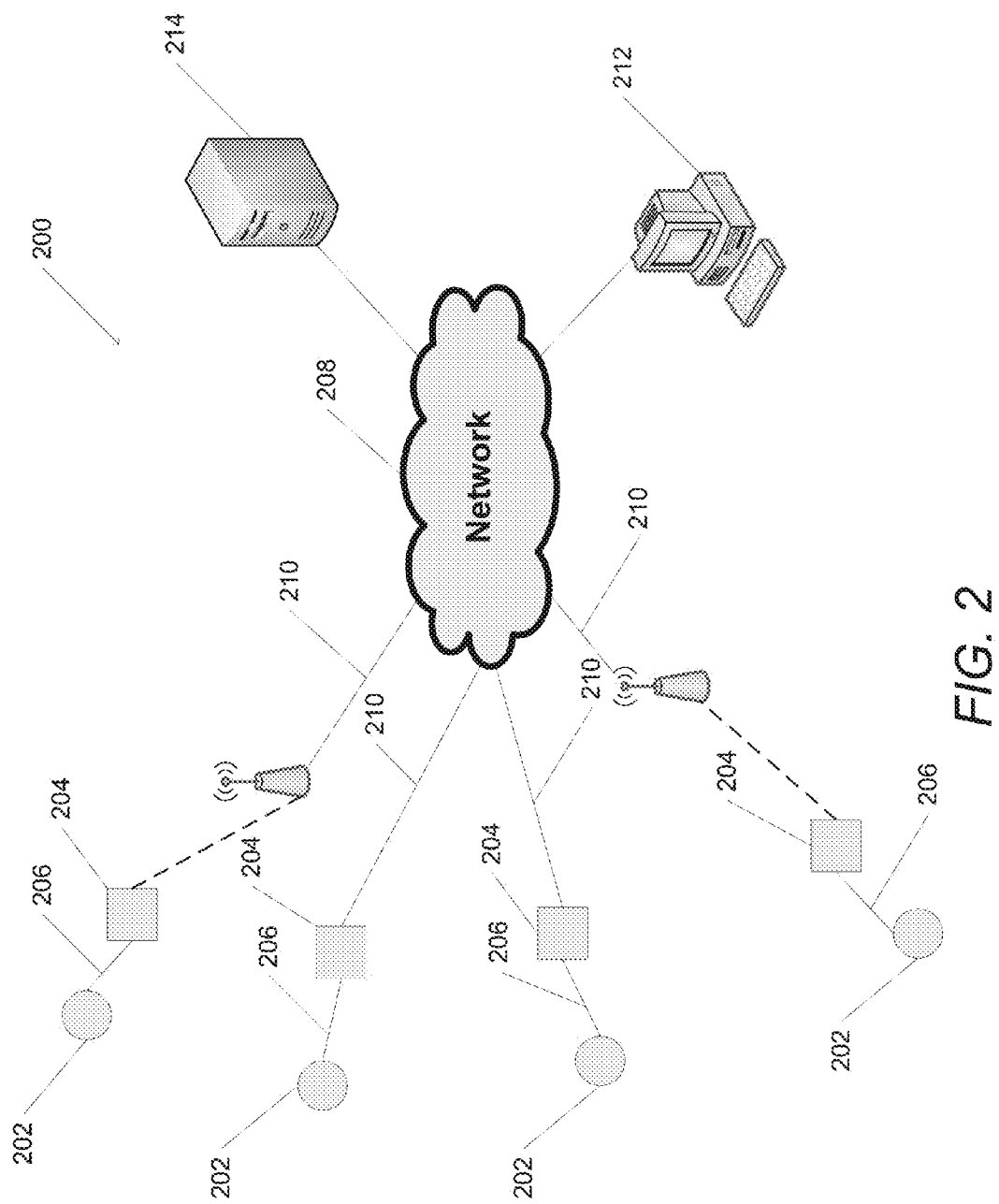
FIG. 2 is a diagram conceptually illustrating electric vehicle nodes connected to a communications network in accordance with an embodiment of the invention.

EV nodes connected to a communications network in accordance with an embodiment of the invention are shown in FIG. 2. EV nodes 202 can connect to EV chargers 204 using a wired and/or wireless charging connection. EV chargers can connect to communication network 208 using wired and/or wireless connections 210. In some embodiments, the power distribution network can act in place of the communication network. The communications network may also be connected to one or more centralized computers 212 to monitor calculations made by or send instructions to multiple EV nodes. Additionally, in many embodiments, a database management system 214 can be connected to the network to track EV node data which, for example, may be used to historically track power usage at various locations or at times of day over time. In many embodiments, EV nodes can use distributed node controllers, where each node can independently perform calculations to achieve optimal charging rates in the EV network. In several other embodiments, EV nodes can use centralized node controllers, where a centralized computer can perform calculations using information from one or more EV nodes to achieve optimal charging rates in the EV network. Although many systems are described above with reference to FIG. 2, any of a variety of systems can be utilized to implement an array of network EV nodes connected at a charging station as appropriate to the requirements of specific applications in accordance with embodiments of the invention. EV node controllers in accordance with various embodiments of the invention are discussed below.

Figure 3:
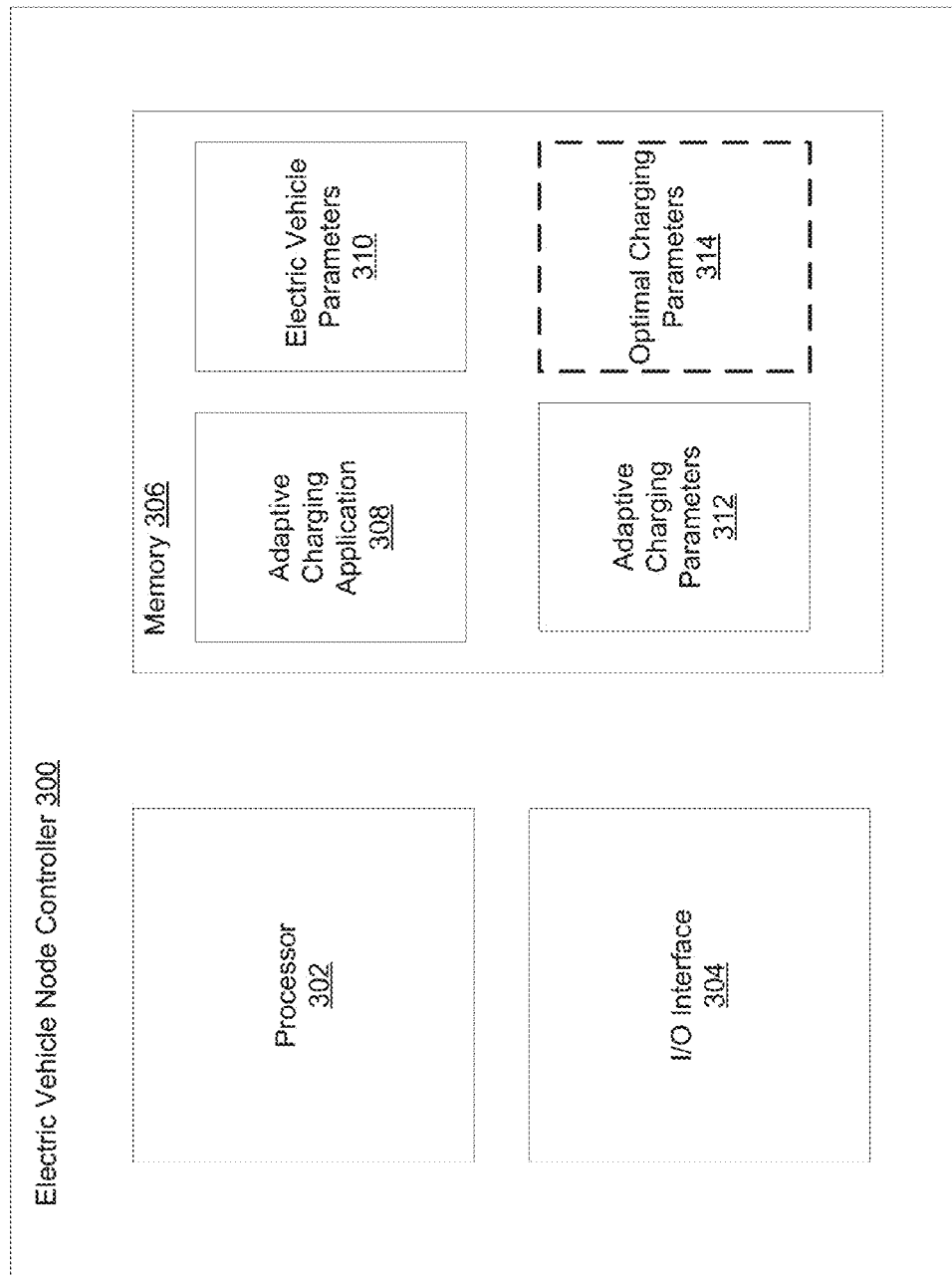
FIG. 3 is a block diagram of an electric vehicle node controller in accordance with an embodiment of the invention.

An EV node controller in accordance with an embodiment e invention is shown in FIG. 3. In various embodiments, EV node controller 300 can perform calculations to determine optimal charging rates for EVs at an electric charging station. In many embodiments, EV node controllers can perform distributed processes, where calculations are performed at each node in the charging station to determine optimal charging rates for EVs. In several other embodiments, EV node controllers transmit data to a centralized computer similar to a centralized computer described above with respect to FIG. 2, and the centralized computer calculates optimal charging rates for EVs at the electric charging station that are connected to the EV node controller for use in the charging of EVs.

The EV node controller includes at least one processor 302, an I/O interface 304, and memory 306. The at least one processor 302, when configured by software stored in memory, can perform calculations on and makes changes to data passing though the I/O interface as well as data stored in memory. In many embodiments, the memory 306 includes software including adaptive charging application 308 as well as electric vehicle parameters 310, adaptive charging parameters 312, and/or optimal charging parameters 314. An EV node can calculate optimal charging parameters by using a combination of its own electric vehicle parameters, adaptive charging parameters, and/or adaptive charging parameters received through the I/O interface. Adaptive charging parameters can include parameters specific to a variety of adaptive charging processes including (but not limited to) least laxity first processes, online linear program processes, and/or linear program with congestion management processes. Adaptive charging processes are discussed below.

Although a number of different EV node controller implementations are described above with reference to FIG. 3, any of a variety of computing systems can be utilized to control an EV node within a charging station as appropriate to the requirements of specific applications in accordance with various embodiments of the invention. An optimal charging problem that can be solved by the coordinated action of EV node controllers in accordance with many embodiments of the invention is discussed below.

Optimal Charging Problem Model

In various embodiments of the invention, an optimal charging problem (OPT) model can be used to solve for an optimal charging rate. A time horizon $T:=\{1,2,\ldots,T\}$ can be fixed. The charging needs of EV i can be described by a vector $(s_i, t_i, e_i, \bar{r}_i)$ where $s_i, t_i \in T$ with the following interpretation. EV i arrives at time $s_i$ with an energy demand $e_i > 0$. It can be charged at any rate exceeding its peak rate $\bar{r}_i > 0$ during the period $\{s_i, s_i+1, \ldots, t_i-1\}$ with the goal of satisfying its energy demand $e_i$ by its deadline $t_i$. In its simplest form the power network is abstracted as a single power limit $P > 0$ with the interpretation that the total charging rate at any time does not exceed the station power limit P. A problem instance is a collection of EVs and a power limit $\mathbb{P} := (s_i, t_i, e_i, \bar{r}_i, i=1, \ldots, N; P)$. A control $r := (r_i(t), t=1, \ldots, T-1, i=1, \ldots, N)$ is a nonnegative vector of charging rates with $r_i(t) := 0$ for $t < s_i$ or $t \geq t_i$.

When formulated in the manner outlined above, the optimal charging problem can be expressed as follows:

OPT:

$$\min_{r \geq 0} C(r) \qquad (3a)$$

$$\text{subject to } r_i(t) = 0 \quad i = 1, \ldots, N, t < s_i \text{ or } t \geq t_i \qquad (3b)$$

$$r_i(\tau) <= \bar{r}_i, \quad i = 1, \ldots, N, \tau = 1, \ldots T-1 \qquad (3c)$$

$$\sum_t r_i(t) = e_i \quad i = 1, \ldots, N \qquad (3d)$$

$$\sum_i r_i(t) \leq P, \quad t = 1, \ldots, T-1 \qquad (3e)$$

Here C(r) is a cost function that can represent optimization constraints including (but not limited to) electricity cost or revenue to the garage, maximum charging delay (makespan), or asset utilization, and/or system robustness. When C(r) is a linear function, OPT is a linear program. Constraints (3b) say that EV i is available for charging only after its arrival time $s_i$ and before its departure time $t_i$. Constraints (3d) say that the energy demands $e_i$ of all EVs i are met before its deadline. In several embodiments, the energy demand $e_i$ can be met or exceeded before the deadline. In a number of embodiments, the energy demand is determined by translating a distance to an energy demand based upon a user identifying a type of EV and the known characteristics of the EV. In several embodiments, the energy demand can be based upon a user specifying a dollar amount of electricity that the user decides to purchase.

Constraints (3e) say that the station power limit P is respected at all times.

Definition 1. Fix a problem instance $\mathbb{P} := (s_i, t_i, e_i, \bar{r}_i, i=1, \ldots, N; P)$. A control $r:=(r_i(t), t=1, \ldots, T-1, i=1, \ldots, N)$ is called feasible (with respect to $\mathbb{P}$) if r satisfies (3b)(3e). A feasible control r* that is a minimizer of (3) is called offline optimal. The problem instance $\mathbb{P}$ is called feasible if there exists a feasible control r.

Clearly, a feasible problem instance $\mathbb{P}$ always has an offline optimal control r*. Such a control, however, is generally not implementable (non-causal) because the solution of OPT requires information on all future EV arrivals. OPT however serves as a lower bound on the cost achievable by any online (causal) charging processes.

Adaptive Charging Processes

Figure 4:
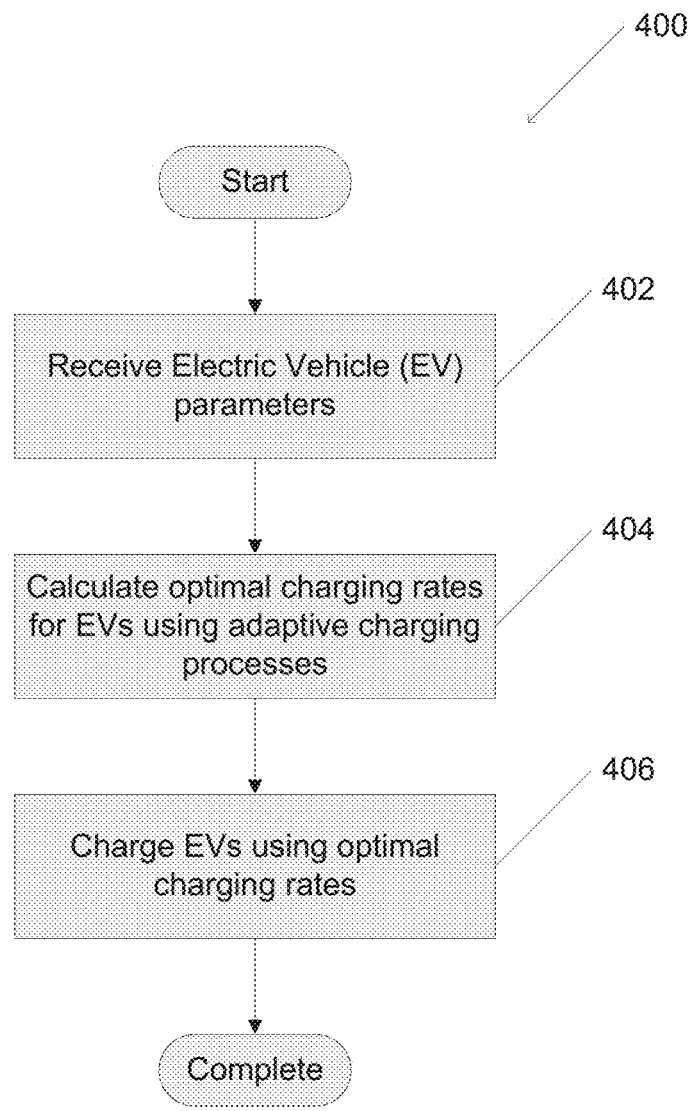
FIG. 4 is a flow chart illustrating a process to solve for optimal charging rates using adaptive charging processes in accordance with an embodiment of the invention.

An overview of an adaptive charging process to solve for OPT is illustrated in FIG. 4. The overview process 400 includes EV parameters being received (402) from EVs assigned by the system when not provided based upon behavior patterns at a charging station (e.g. people tend to park in the same space) and/or charging or communications characteristics of and EV connected to a charger. Parameters can include (but are not limited to) arrival time, energy demand, peak rate, and/or station power limit. An optimal charging rate for the EVs is calculated (404) using an adaptive charging process. A variety of adaptive charging processes can be used including (but not limited to) least laxity first processes, online leaner program processes, and/or linear program processes that incorporate congestion management. A least laxity first process will be discussed below with respect to FIG. 5. Additionally, an online linear program process will be discussed below with respect to FIG. 6. Furthermore, a linear program process incorporating congestion management with be discussed below with respect to FIG. 9. EVs can be charged (406) using an optimal charging rate. Although many different adaptive charging processes are described above with reference to FIG. 4, any of a variety of processes may be utilized to calculate charging rate for electric vehicles as appropriate to the requirements of specific applications in accordance with embodiments of the invention. Least laxity first processes in accordance with many embodiments of the invention are discussed below.

Least Laxity First Processes

Figure 5:
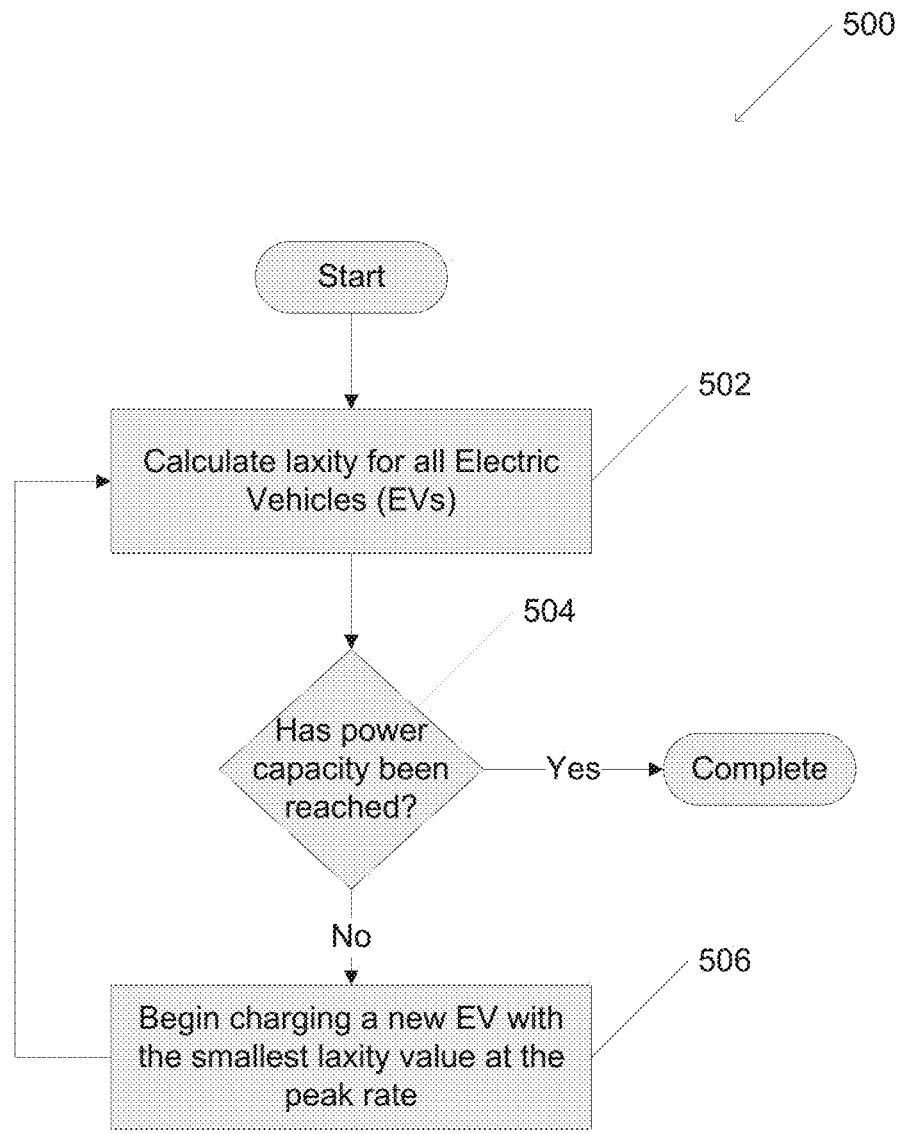
FIG. 5 is a flow chart illustrating a process to charge for optimal charging rates using a least laxity first process in accordance with an embodiment of the invention.

A least laxity first (LLF) process to solve the OPT problem is illustrated in FIG. 5. The LLF process includes laxity for all EVs being calculated (502). In several embodiments of the invention, laxity can be the time an EV has before it must charge at its peak rate in order to meet a deadline. If the power capacity for the charging station has not been reached (504), a new EV with the smallest laxity value begins charging (506). In several embodiments, once an EV obtains its energy demand, the EV with the smallest laxity value can begin charging at or below its peak rate. The power capacity of the charging station continues to be allocated based upon laxity until all EVs are charging at their peak or the combined rates reaches the power capacity limit of the charging station. The determination involves calculating (502) laxity for all EVs. It should be readily apparent to one having ordinary skill in the art that the process can repeat as needed depending on when new EVs arrive at and/or depart from the charging station.

In many embodiments of the invention, LLF processes can be distributed processes where laxity calculations can be performed at each EV node. In various other embodiments of the invention, LLF processes can be centralized processes, where each EV node sends EV parameters to a centralized computer system which calculates laxity for nodes. Furthermore, hybrid approaches can use a combination of distributed and centralized calculations in accordance with many embodiments of the invention. Although many different LLF processes are described above with reference to FIG. 5, any of a variety of processes may be utilized to schedule EVs based on laxity as appropriate to the requirements of specific applications in accordance with many embodiments of the invention. Implementations of LLF processes in accordance with various embodiments of the invention will be discussed below.

At each time t, $e_i(t)$ can denote the remaining energy demand of EV i at time t which satisfies $$e_i(t+1) = e_i(t) - r_i(t), \; e_i(s_i) = e_i, \; t = s_i, \ldots, t_i - 1$$

Define $$l_i(t) := 1 - \frac{e_i(t)}{\bar{r}_i(t_i - t)} \quad (4)$$

$l_i(t)$ can be called the laxity of EV i at time t. In several embodiments of the invention, laxity is the slack time i has before it must charge at its peak rate $\bar{r}_i$ in order to meet its deadline and depends on its remaining energy demand $e_i(t)$, the remaining charging time $t-t_i$, and its peak charging rate $\bar{r}_i$. Note that in several embodiments of the invention, $l_i(t)$ can be computed by individual EVs using only local information. However, in many other embodiments of the invention $l_i(t)$ can be computed by a centralized computer.

In some embodiments of the invention, the LLF policy gives priority to EVs with the least laxity: at any time t, it charges EV's with the smallest $l_i(t)$ at their peak rates $\bar{r}_i$ until the power capacity P is reached.

Formally, suppose without loss of generality that the laxity values $l_i(t)$ at time t are ordered such that $$l_1(t) \leq l_2(t) \leq \ldots \leq l_N(t)$$

and $\gamma(t) \in \{1, \ldots, N\}$ can be an EV index such that $$\sum_{i=1}^{\gamma(t)} \min(\bar{r}_i, e_i(t)) \leq P < \sum_{i=1}^{\gamma(t)+1} \min(\bar{r}_i, e_i(t)) \quad (5a)$$

The charging rates r under LLF are given by: at each time $t \in \{s_i, \ldots, t_i-1\}$ $$r_i(t) = \begin{cases} \min(\bar{r}_i, e_i(t)) & i = 1, \ldots, \gamma(t) \\ P - \sum_{i=1}^{\gamma(t)} \min(\bar{r}_i, e_i(t)) & i = \gamma(t)+1 \\ 0 & i > \gamma(t)+1 \end{cases} \quad (5b)$$

Figure 7:
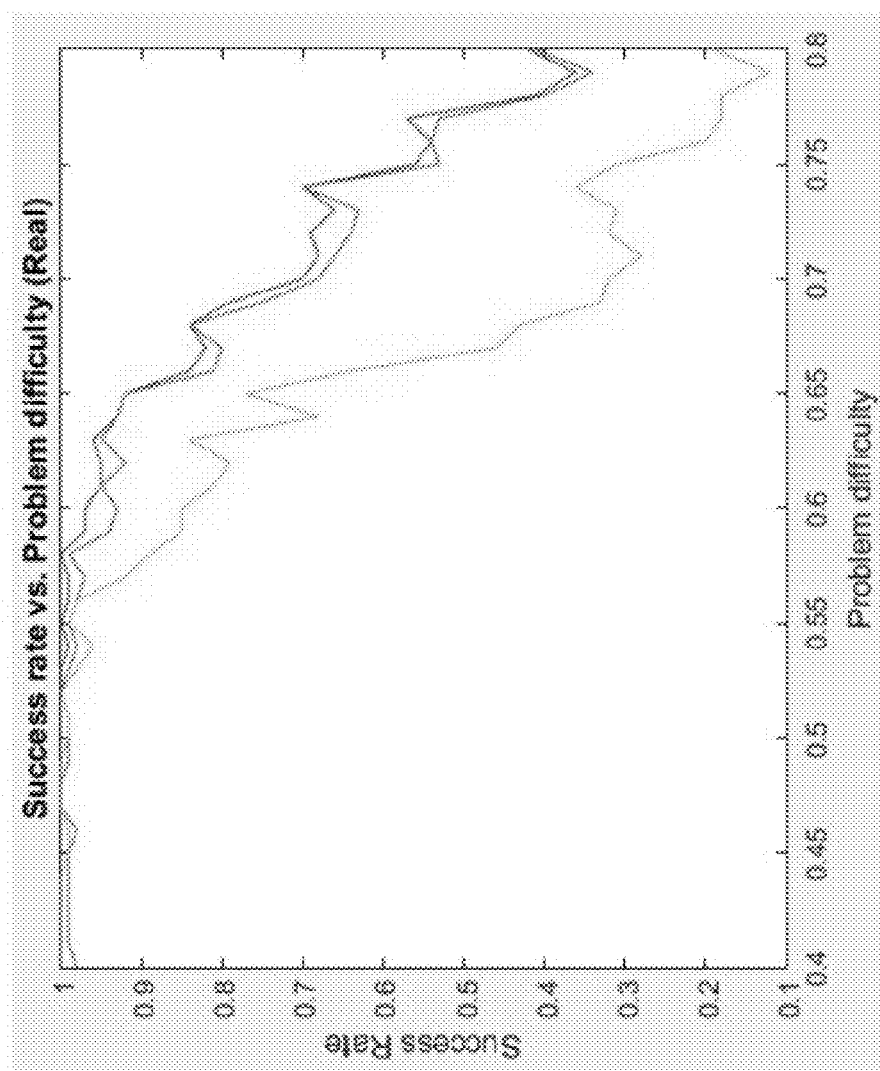
FIG. 7 is a graph illustrating the success rates for least laxity first processes, online linear program processes, and optimal charging problem accordance with an embodiment of the invention.
Figure 8:
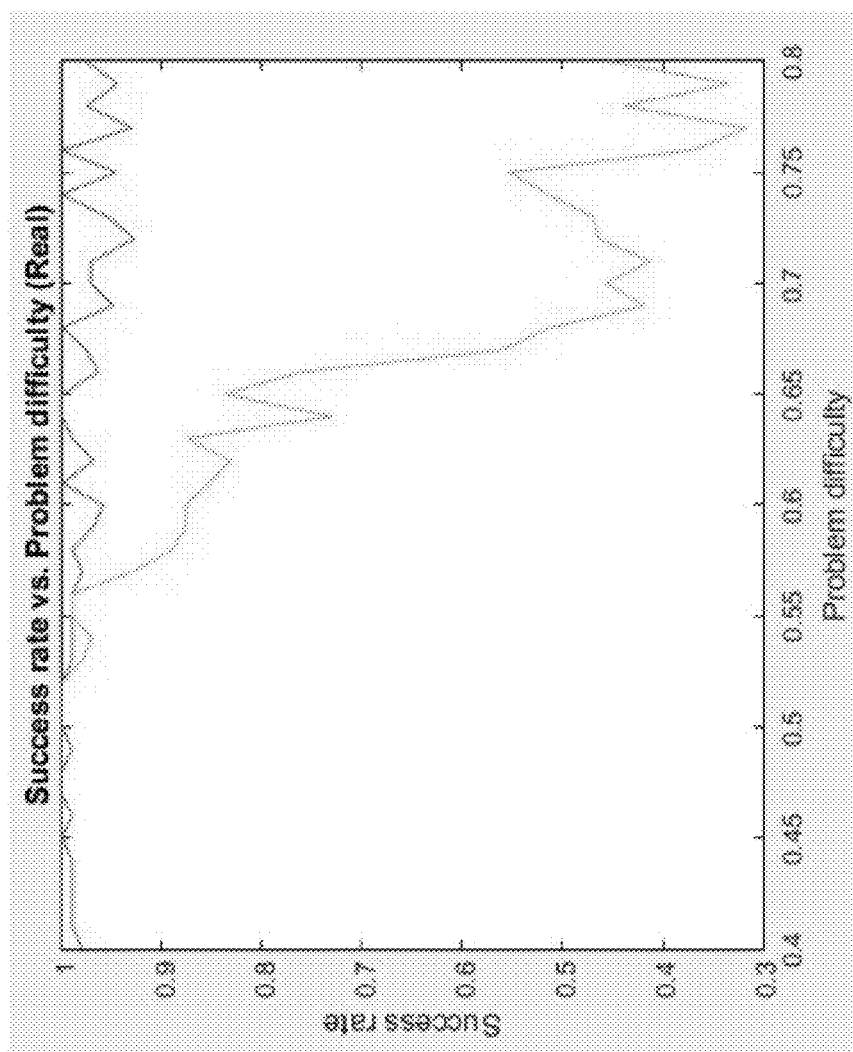
FIG. 8 is a graph illustrating the success rates for least laxity first, online linear program processes normalized by the optimal charging problem in accordance with an embodiment of the invention.

LLF is computationally very simple to implement, either centrally or in a distributed manner. The distributed approach is as follows. Each charger computes its own laxity based only on local information. They send their own laxity values to the server, which ranks them and acknowledges those EVs that should charge at their peak rates in that control interval. EVs that do not receive an acknowledgment do not charge in that control interval. LLF is therefore highly scalable, both in number of EVs and control frequency. THe effectiveness of LLF with contrast with other charging processes is discussed below with reference to FIGS. 7 and 8. FIG. 7 illustrates the success rates of LLF, OLP, and OPT. FIG. 8 illustrates the success rates of LLF and OLP normalized by OPTs.

The laxity $l_i(t)$ possesses some simple properties.
Theorem 1. For any control r(feasible or not) have:

$$l_i(t+1) \geq 0 \Rightarrow l_i(t) \geq 0$$

$$l_i(t+1) < 0 \Rightarrow l_i(t) < \frac{\bar{r}_i - r_i(t)}{\bar{r}_i(t_i - t)}$$

There are several interesting implications of the theorem. First it means that a feasible control r must maintain a nonnegative laxity $r_i(t)$ for all EV's i at all times t. Once the laxity $l_i(t)$ of an EV i drops to zero then it must be charged at its peak rate $\bar{r}_i$ for its remaining time before departure. Second it implies a necessary condition going backward in time on an infeasible control that leads to a proof that LLF does not always compute a feasible control r even when the problem instance $\mathbb{P}$ is feasible. This is confirmed by extensive simulations of LLF which are described below. Intuitively, the problem is that LLF gives priority to EV's with the smallest $l_i(t)$ and can starve other EV's with higher $l_i(t)$. When EVs with the smallest laxity finish, the remaining EV's can be capped by their peak rates, leading to wasted station capacity P and failure to meet some of the deadlines. As discussed below, formulating the OPT problem as a linear program enables the use of solvers that can provide EVs at a charging station with their energy demand in circumstances in which a LLF process will no provide all EVs with their energy demand.

Online Linear Program Processes

Figure 6:
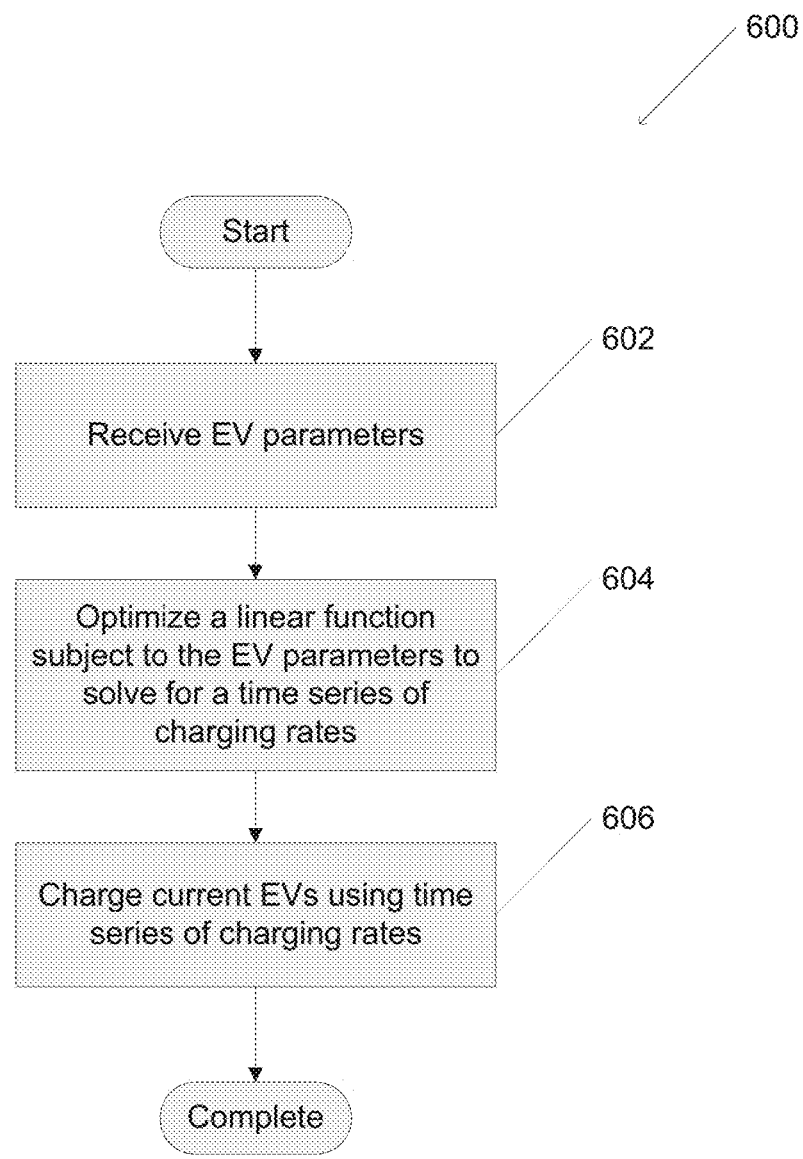
FIG. 6 is a flow chart illustrating a process to solve for optimal charging rates using an online linear program process in accordance with an embodiment of the invention.

An Online Linear Program (OLP) Process that can be used to solve the OPT problem is illustrated in FIG. 6. When a cost function in the OPT problem is a linear function, OPT can become a linear program. Cost functions can include (but are not limited to) electricity costs, revenue to a garage, maximum charge delay, asset utilization, and/or system robustness. In many embodiments of the invention, OLP is an online process compared to OPT which is an offline process. An online process is one that involves communication with EV nodes while an offline process can use stored EV parameters and is not required to be connected to EV nodes to perform calculations. In many embodiments of the invention, OLP processes can use an EV departure time parameter (i.e. time when the EV leaves the charging station) in addition to a deadline parameter used by OPT processes.

The OLP process 600 includes receiving (602) EV parameters. In many embodiments of the invention, EV parameters can include (but are not limited to) time, adaptive charging parameters, peak charging rate, departure time, charging station power limit, charging deadline, and/or total number of EVs at the charging station. A linear function is optimized (604) subject to the EV parameters to solve for a time series of charging rates. In several embodiments of the invention, this linear function is a cost function. Current EVs at the charging station are charged (606) using a time series of charging rates. The process completes. In many embodiments, the OLP process repeats itself and EV parameters are received (602) at time (t+1) for any EV at the charging station. In a number of embodiments, a cost function is utilized that promotes maximizing overall charging rate. Use of such or cost functions typically results in the system handling new EV arrivals in a close to optimal manner (i.e. having a high likelihood that EV energy demand can be met when new EVs arrive). Although many different OLP processes are described above with reference to FIG. 6, any of a variety of processes may be utilized to solve an OPT problem with a linear program cost function as appropriate to the requirements of specific applications in accordance with many embodiments of the invention. Implementations of OLP processes in accordance with various embodiments of the invention will be discussed below.

At any time t, $V(t) := (t_i, e_i(t), \bar{r}_i, i=1, \ldots, N(t))$ can denote the set of EVs currently in the charging infrastructure and P can be the power limit. Here $t_i$ is i's departure time and $e_i(t)$ is its remaining energy demand at time t. Consider the online optimal charging problem at each time t:

OLP(t):

$$\min_{r_i(\tau), \tau \geq t} C(r) \tag{6a}$$

$$\text{subject to } r_i(\tau) = 0 \quad i = 1, \ldots, N, \tau \geq t_i \tag{6b}$$

$$r_i(\tau) \leq \bar{r}_i, \quad i = 1, \ldots, N, \tau = 1, \ldots T - 1 \tag{6c}$$

$$\sum_{\tau=t}^{T-1} r_i(\tau) = e_i(t) \quad i = 1, \ldots, N \tag{6d}$$

$$\sum_i r_i(\tau) \leq P, \quad \tau = t, \ldots, T - 1 \tag{6e}$$

In some embodiments of the invention, at any time t, adaptive charging processes construct the online linear program OLP(t) (6) and solve for the optimal charging rate vector $r^*(t) := (r^*_i(\tau), \tau=t, \ldots, t_i-1, i=1, \ldots, N(t))$. Note that the optimal result is a time series of charging rates for each EV nodes that results in each EV obtaining at least its energy demands prior to its departure time. It then charges EV i at rate $r^*_i(t)$. At time t+1, with a possibly different set of EVs due to new arrivals and departures, it constructs a new OLP(t+1) and the cycle repeats.

FIG. 7 and FIG. 8 show the simulations of LLF processes and OLP processes in comparison with the offline OPT process (for benchmarking). The 2010-2012 EV dataset can be used that provides 4,000 problem instances (arrival and departure times). The number of these problem instances that are feasible under OPT, LLF; and OLP are shown in FIG. 7. As the problem becomes more and more difficult (as measured by the average value of $1-l_i(s_i)$), the percent of feasible problem instances decreases significantly. An OPT process as a benchmark is successful only on 50% of the problem instances when problem difficulty reaches 75%. Interestingly OLP's success rate is almost the same as OPT's which is maximum possible. In contrast, while LLF is simple, simulations computationally fail to meet all demands significantly more often than OLP. This is shown clearly in FIG. 8 which compares the success rates of LLF and OLP only on instances that are feasible (for OPT).

Linear Program with Congestion Management Processes

Figure 9:
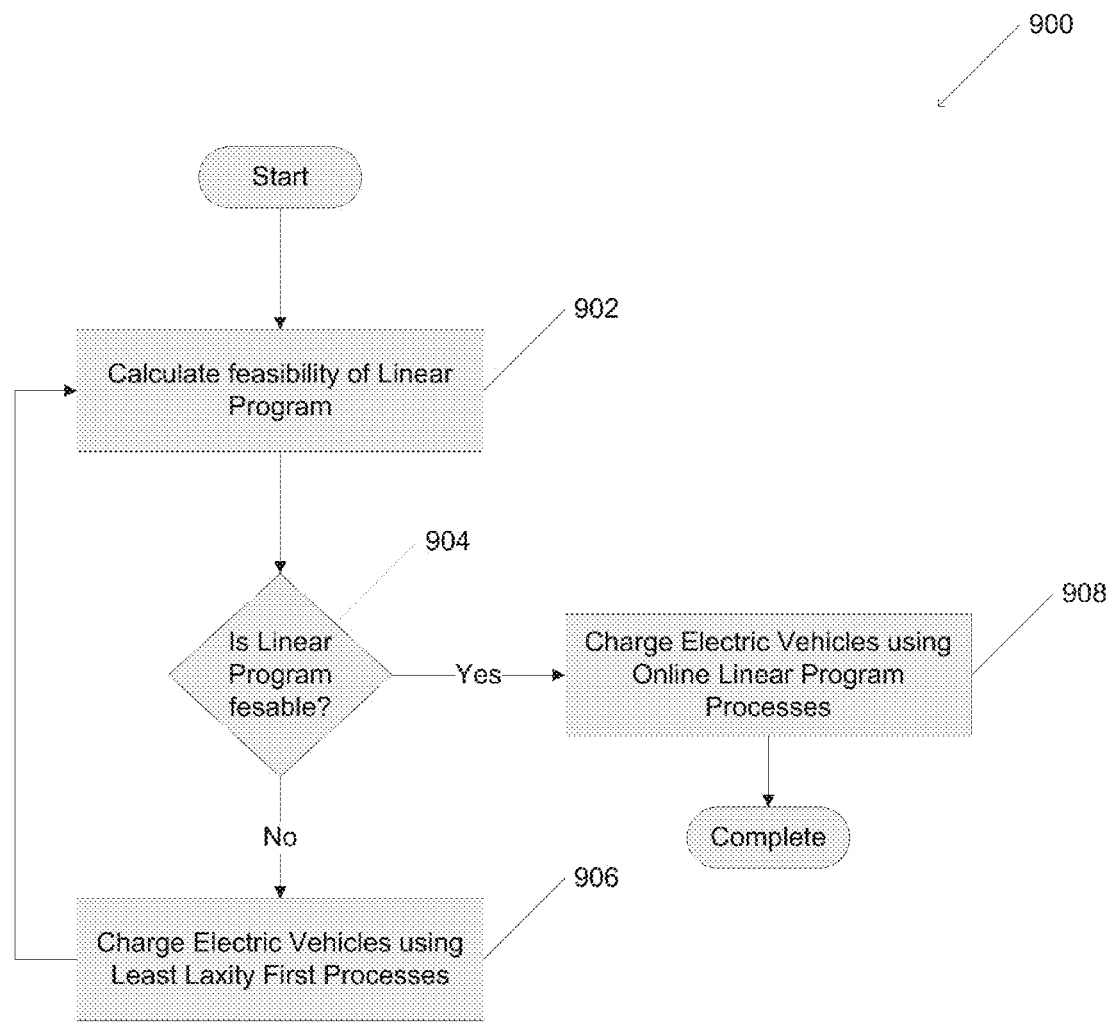
FIG. 9 is a flow chart illustrating a process to solve for optimal charging rates using a liner program incorporating a congestion management process in accordance with an embodiment of the invention.

A linear program (LP) process that integrates congestion management is illustrated in FIG. 9. At times of heavy use, many EVs utilize the charging station network and in some cases not all demands can be met. This potential failure to meet demands is called congestion. In various embodiments of the invention, congestion management can be used with linear program based processes. The process 900 includes calculating (902) the feasibility of the linear program. In many embodiments of the invention, an offline linear program can be used to calculate the feasibility. In several other embodiments invention, an OLP process can be used to calculate feasibility. If the linear program is not feasible (904), the EVs are charged (906) using LLF processes. LLF processes similar to those described above with respect to FIG. 5 can be used. Once the LLF process is complete, the feasibility of the LP can be recalculated (902) and the cycle begins again until the linear program is feasible. If the linear program is feasible (904), the EVs can be charged (908) using OLP processes. OLP processes similar to those described above with respect to FIG. 6 can be utilized.

Once the OLP process completes, congestion has been managed and the LP with congestion management process completes. It should be readily apparent to one having ordinary skill in the art that LPs with congestion management processes can repeat necessary as new EVs arrive at and leave from a charging station. It should be readily apparent to one having ordinary skill in the art that congestion management processes are not limited to LLF and/or OLP processes, and a variety of other adaptive charging processes can be utilized as appropriate for congestion management in an EV charging network. Although a variety of LPs with congestion management processes are described above with respect to FIG. 9, any of a variety of processes may be utilized for congestion management in a charging station as appropriate to the requirements of specific applications in accordance with embodiments of the invention. Implementations of LPs with congestion management processes in accordance with several embodiments of the invention are discussed below.

Figure 10:
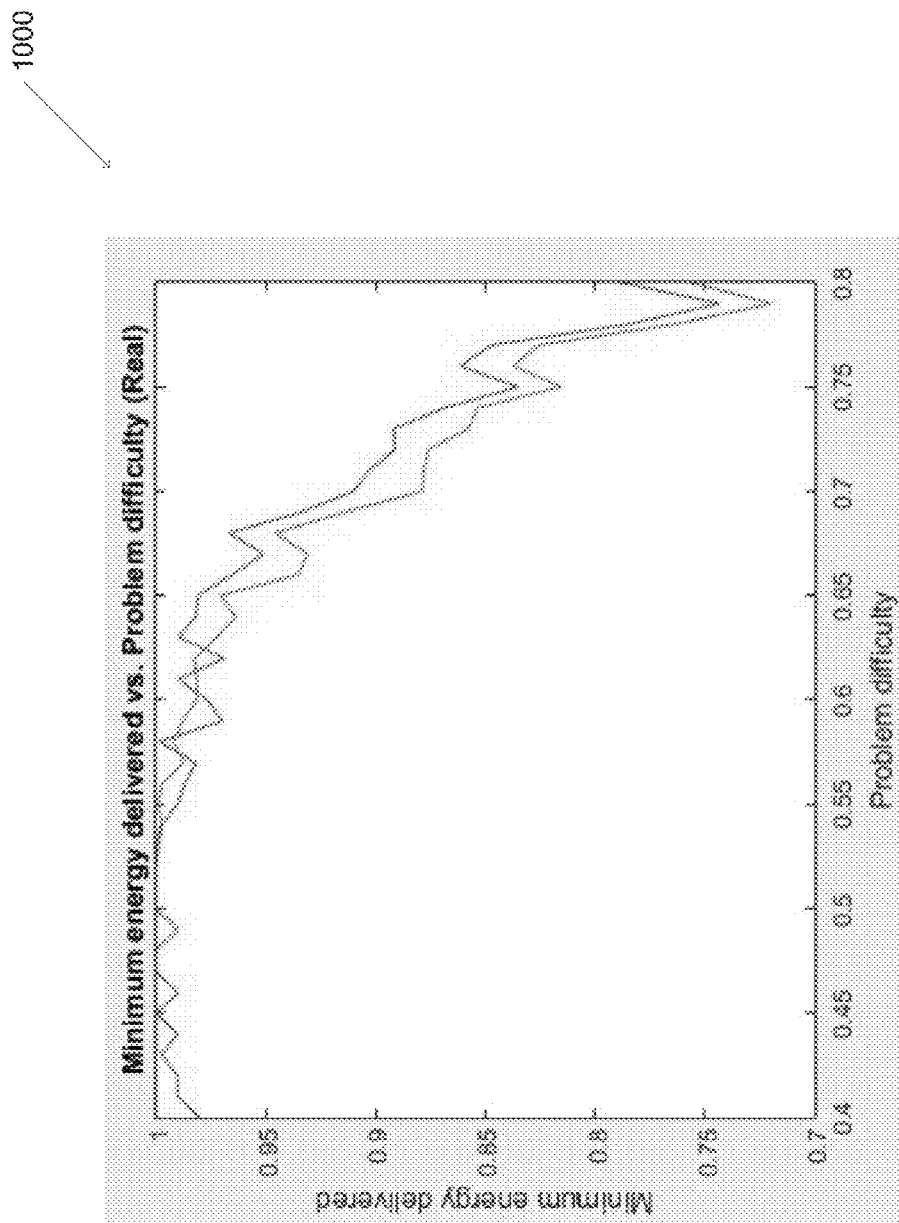
FIG. 10 is a graph illustrating the smallest percentage of energy delivered for infeasible problem instances in accordance with an embodiment of the invention.

Congestion can impact the feasibility of processes. FIG. 7 shows that fraction of realistic problem instances (50% at a problem difficulty level of 75%) are infeasible. This means that even the offline process, OPT cannot satisfy all EV demands by their deadlines at times of congestion. FIG. 10 further shows that during congested periods, EVs can fall short of their energy demand by close to 20% in the worst case (at a problem difficulty level of 75%). FIG. 10 further illustrates the smallest percent energy delivered for infeasible problem instances.

In summary, times of congestion are common and during those times the worst-case shortage can be unacceptable to EVs that have inelastic energy demands. This motivates processes that explicitly manage charging shortfall among competing EVs during times of congestion when not all EV demands can be accommodated.

Figure 11:
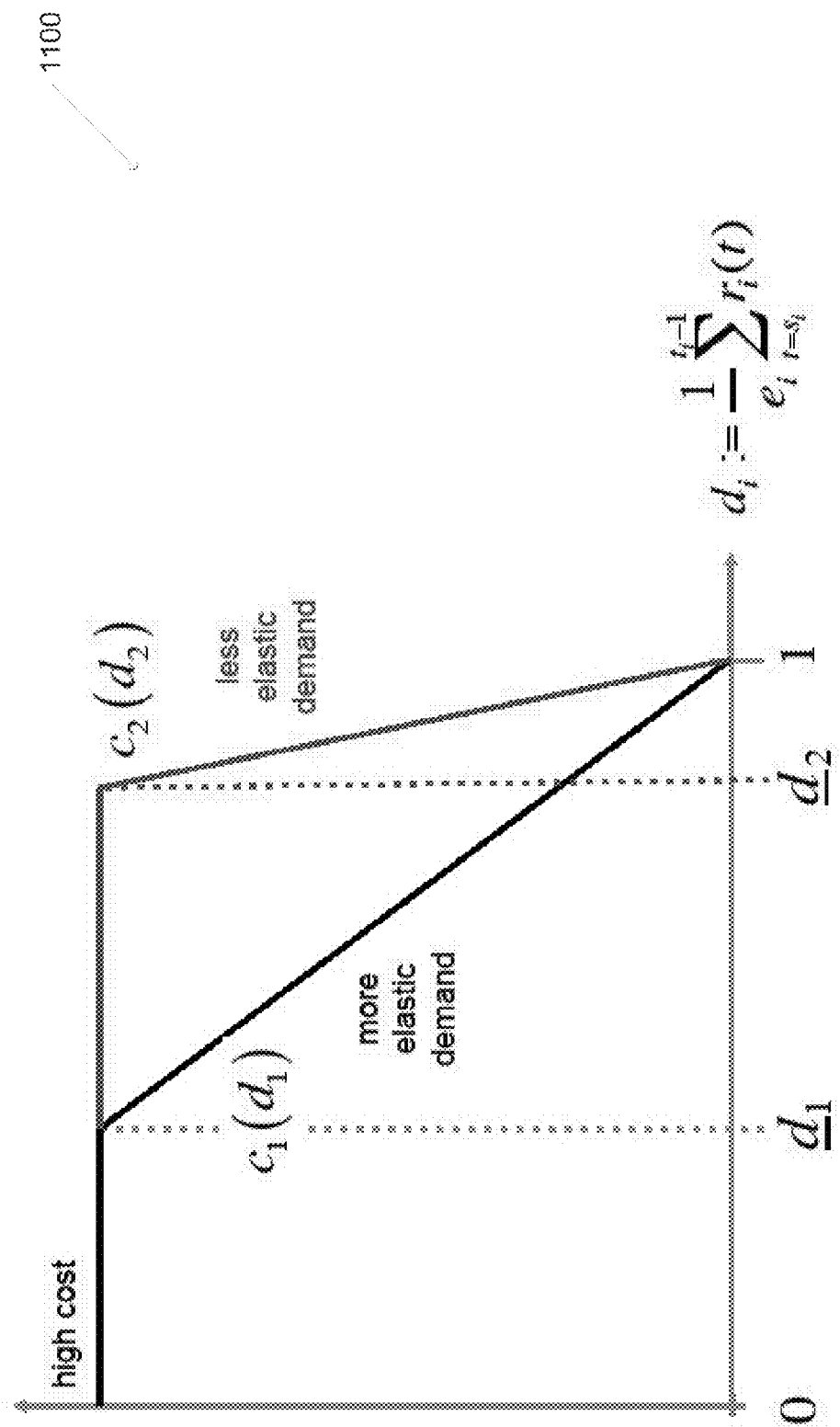
FIG. 11 is a graph illustrating EV cost functions in accordance with an embodiment of the invention.

To illustrate congestion management processes, $\underline{d}_i \in [0,1]$ can denote the minimum energy that must be delivered to EV i, normalized by its energy demand $e_i$. A completely inelastic demand has $\underline{d}_i=1$ (i must receive full charge) and a fully elastic demand has $\underline{d}_i=0$. $c_i(d_i)$ can denote the cost as a function of energy delivered $d_i:=\Sigma_{t=s_i}^{t_i-1} r_i(t)/e_i$, normalized by $e_i$. FIG. 11 shows two example cost functions $c_i(d_i)$. FIG. 11 further illustrates EV cost functions: the demand of EV 1 (with a lower minimum demand $\underline{d}_1$) is more elastic than that of EV2 (with a higher minimum demand $\underline{d}_2$). The offline optimal charging problem OPT (3) can be modified by relaxing the constraint (3d) into (7d) and including the costs $c_i(d_i)$ in the objective:

*OPT-cm*:

$$\min_{r \geq 0} C(r) + \sum_i c_i(d_i) \quad (7a)$$

$$\text{subject to } r_i(t) = 0 \quad i = 1, \ldots, N, t < s_i \text{ or } t \geq t_i \quad (7b)$$

$$r_i(\tau) <= \overline{r}_i, \quad i = 1, \ldots, N, \tau = 1, \ldots T-1 \quad (7c)$$

$$d_i := \frac{1}{e_i}\sum_{t=s_i}^{t_i-1} r_i(t) \geq \underline{d}_i, \quad i = 1, \ldots, N \quad (7d)$$

$$\sum_i r_i(t) \leq P, \quad t = 1, \ldots, T-1 \quad (7e)$$

The new constraint (7d) enlarges the feasible set and increases the chance for an (online or offline) process to compute a feasible control r. Under this policy, adaptive charging processes may not always fully meet the energy demands $e_i$ of all EVs, but incurs a cost, measured by $\Sigma_i c_i(d_i)$, when demands are not met by their deadlines.

Note again that the problem formulation OPT with congestion management OPT-cm (7) is offline (noncausal) and therefore not implementable, though it serves as a performance benchmark for other processes. However just as the offline OPT process can be converted into an online LP process, OPT-cm can similarly be converted into an online OLP-cm.

Although the present invention has been described in certain specific aspects, many additional modifications and variations would be apparent to those skilled in the art. It is there to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An electric vehicle charging network, comprising:
   one or more centralized computing systems;
   a communications network;
   a plurality of electric vehicle node controllers, where each electric vehicle node controller in the plurality of node controllers contains:
      a network interface;
      a processor;
      a memory containing:
         an adaptive charging application;
         a plurality of electric vehicle node parameters describing charging parameters of an electric vehicle node in the electric vehicle charging network;
   where the processor is configured by the adaptive charging application to:
      send electric vehicle node parameters to the one or more centralized computing systems; and
      charge the electric vehicle node using a charging rate received from the one or more centralized computing systems;
   where the one or more centralized computing systems is configured to:
      receive the electric vehicle node parameters from the plurality of electric vehicle node controllers;
      calculate a plurality of charging rates for the plurality of electric vehicle node controllers using the electric vehicle node parameters, a plurality of adaptive charging parameters, and a cost function; and
      send the charging rates to the plurality of electric vehicle node controllers;
   wherein:
      the charging rates for a first set of electric vehicle node controllers are a maximum charging rate;
      the charging rates for a second set of electric vehicle node controllers are zero charge; and
      the charging rate for one electric vehicle node controller is less than the maximum charging rate;
   wherein distributing charging rates into the first set of electric vehicle node controllers, the second set of electric vehicle node controllers, and one electric vehicle node controller is a least laxity first process;

wherein the least laxity first process further includes calculating a plurality of laxity parameters corresponding to the plurality of electric vehicle nodes, where the electric vehicle with a smallest laxity parameter value is charged first;

wherein a laxity parameter in a plurality of laxity parameters is a slack time the corresponding electric vehicle node has before it must charge at its peak rate in order to meet a deadline;

wherein a laxity parameter in the plurality of laxity parameters can be evaluated by the one or more centralized computing systems using the following expression:

$$l_i(t) := 1 - \frac{e_i(t)}{\bar{r}_i(t_i - t)}$$

where $l_i(t)$ is the laxity parameter, t is a time, $t_i$ is a deadline, $e_i(t)$ is a remaining energy demand, and $\bar{r}_i$ is a peak rate.

2. The electric vehicle charging network of claim 1, wherein the charging rates meet an energy demand of the plurality of electric vehicle nodes by a plurality of departure times.

3. The electric vehicle charging network of claim 1, wherein the charging rates for the plurality of electric vehicle nodes are a time series of timing rates provided to each electric vehicle node controller.

4. The electric vehicle charging network of claim 1, wherein a time series of timing rates is calculated using an online linear program process.

5. The electric vehicle charging network of claim 3, wherein the electric vehicle node parameters include an electric vehicle departure time, a remaining energy demand, and a peak charging rate.

6. The electric vehicle charging network of claim 3, wherein the time series of timing rates can be evaluated by the one or more centralized computing systems using the following expression:

$$OLP(t):$$
$$\min_{r_i(\tau), \tau \geq t} C(r)$$

subject to $r_i(\tau) = 0 \quad i = 1, \ldots, N, \tau \geq t_i$ $r_i(\tau) <= \bar{r}_i, \quad i = 1, \ldots, N, \tau = 1, \ldots T-1$ $\sum_{\tau=t}^{T-1} r_i(\tau) = e_i(t) \quad i = 1, \ldots, N$ $\sum_i r_i(\tau) \leq P, \quad \tau = t, \ldots, T-1$ where OLP(t) are the adaptive charging parameters, t and T are times, $\bar{r}_i$ is a peak charging rate of electric vehicle i, τ is a departure time, $r_i(\tau)$ is a calculated charging rate for an electric vehicle node at time τ, C(r) is a linear cost function, N is a total number of electric vehicles, P is a station power limit, and $t_i$ is a deadline.

7. The electric vehicle charging network of claim 3, wherein the cost function can be evaluated by the one or more centralized computing systems using the following expression:

$$r^*(t) := (r^*_i(\tau), \tau = t, \ldots, t_i - 1, i = 1, \ldots, N(t))$$

where t is a time, $r^*(\tau)$ is an optimal charging rate at time τ, $r^*(t)$ is a vector of charging rates for current and future times, τ is a departure time, i is an electric vehicle, and N(t) is a number of electric vehicles at time t.

8. The electric vehicle charging network of claim 1, wherein the cost function is a linear function.

9. The electric vehicle charging network of claim 1, wherein the cost function comprises a cost function selected from a group consisting of electricity cost, revenue to a garage, maximum charging delay, asset utilization, and system robustness.

10. The electric vehicle charging network of claim 1, wherein calculating a laxity parameter is a distributed process.

11. The electric vehicle charging network of claim 1, wherein calculating a laxity parameter is a centralized process.

12. An electric vehicle charging network, comprising:
one or more centralized computing systems;
a communications network;
a plurality of electric vehicle node controllers, where each electric vehicle node controller in the plurality of node controllers contains:
a network interface;
a processor:
a memory containing:
an adaptive charging application;
a plurality of electric vehicle node parameters describing charging parameters of an electric vehicle node in the electric vehicle charging network;
where the processor is configured by the adaptive charging application to:
send electric vehicle node parameters to the one or more centralized computing systems; and
charge the electric vehicle node using a charging rate received from the one or more centralized computing systems;
where the one or more centralized computing systems is configured to:
calculate a feasibility of a plurality of adaptive charging parameters and a cost function parameter, where the adaptive charging parameters describe the electric vehicle charging network;
wherein where the plurality of adaptive charging parameters and the cost function parameter are feasible, calculate charging rates for the plurality of electric vehicle node controllers where the charging rates are a time series of timing rates;
wherein where the plurality of adaptive charging parameters and the cost function parameter are not feasible, calculate charging rates for the plurality of electric vehicle node controllers where:
the charging rates for a first set of electric vehicle node controllers are a maximum charging rate;
the charging rates for a second set of electric vehicle node controllers are zero charge; and
the charging rate for one electric vehicle node controller is less than the maximum charging rate; and
send the charging rates to the plurality of electric vehicle node controllers;
wherein the plurality of adaptive charging parameters can be evaluated by the one or more centralized computing systems using the following expressions:

OPT-cm:

$$\min_{r \geq 0} C(r) + \sum_i c_i(d_i)$$

subject to $r_i(t) = 0 \quad i = 1, \ldots, N, t < s_i$ or $t \geq t_i$ $r_i(\tau) <= \overline{r_i}, \quad i = 1, \ldots, N, \tau = 1, \ldots T-1$ $d_i := \frac{1}{e_i} \sum_{t=s_i}^{t_i-1} r_i(t) \geq \underline{d_i}, \quad i = 1, \ldots, N$ $\sum_i r_i(t) \leq P, \quad t = 1, \ldots, T-1$ where OPT-cm are the adaptive charging parameters, i is an electric vehicle, N is a total number of electric vehicles, C(r) is a linear cost function, $c_i$ ($d_i$) are cost parameters, $r_i$ is a rate, $r_i(\tau)$ is a calculated charging rate for an electric vehicle node at time τ, $s_i$ is an arrival time, $t_i$ is a deadline, t and T are times, and P is a station power limit.

13. The electric vehicle charging network of claim 12, wherein the cost function parameter is a linear function.

14. The electric vehicle charging network of claim 12, wherein the cost function parameter is selected from a group consisting of electricity cost, revenue to a garage, maximum charging delay, asset utilization, and system robustness.

15. The electric vehicle charging network of claim 12, wherein where the plurality of adaptive charging parameters and the cost function parameter are feasible, calculate charging rates using an online linear program process.

16. The electric vehicle charging network of claim 12, wherein where the plurality of adaptive charging parameters and the cost function parameter are not feasible, calculate charging rates using at least laxity first process.

* * * * *